United States Patent [19]
Keller

[11] Patent Number: 5,678,880
[45] Date of Patent: Oct. 21, 1997

[54] VISOR EXTENDER

[76] Inventor: Lucius W. Keller, 1421 Genoa Dr., Vista, Calif. 92083

[21] Appl. No.: 739,506

[22] Filed: Oct. 28, 1996

Related U.S. Application Data

[60] Provisional application No. 60/006,798 Nov. 15, 1995.
[51] Int. Cl.[6] .................................................... B60J 3/00
[52] U.S. Cl. .................................. 296/97.6; 296/97.11
[58] Field of Search ............................ 296/97.6, 97.9, 296/97.11, 97.12, 97.13

[56] References Cited

U.S. PATENT DOCUMENTS

| | | | |
|---|---|---|---|
| 2,458,125 | 1/1949 | Winkler | 296/97.6 X |
| 4,352,519 | 10/1982 | Aro | 296/97.6 |
| 4,580,829 | 4/1986 | Matheopoulos | 296/97.6 |
| 4,734,955 | 4/1988 | Connor | 296/97.9 X |
| 4,845,809 | 7/1989 | Pillifant, Jr. | 296/97.6 X |
| 5,040,840 | 8/1991 | Kokeisl | 296/97.6 |

Primary Examiner—Joseph D. Pape
Attorney, Agent, or Firm—Wagner & Middlebrook

[57] ABSTRACT

An attachment to a vehicle sunshade/visor, used to provide additional eye protection to the driver and/or front seat passenger from the sun and glare and the skin from ultra violet rays. The attachment extends below the existing visor and/or the side to protect the area between the existing visor and the rear view mirror. The attachment may also provide additional protection to the side of the vehicle, below and to the rear to cover the area not protected by the existing visor. The attachment is easily manipulated by one hand and folds up behind the existing visor when not required.

13 Claims, 3 Drawing Sheets ized to the left to block the sun.

VISOR EXTENDER

REFERENCE TO RELATED APPLICATION(S)

This application claims benefit of U.S. Provisional application(s) No(s) 60/006,798, filed Nov. 15, 1995.

BRIEF SUMMARY OF THE INVENTION

This invention relates to an extension for permanently installed sun visors in automobiles, trucks, aircraft and other vehicles. Frequently such visors simply do not adequately cover the windshield or window areas through which the driver or other operator is exposed to direct sunlight. Typical of such areas are those between the visor and a rear view mirror, below the visor, or between the windshield post and the visor.

The visor extension disclosed herein includes a separate panel attached to which is a support rod, a collar around the rod and a resilient clamp attached to the collar, which clamp also attaches the panel to the lower edge of the sun visor. The support rod preferably has a non-circular cross section, such as a cruciform shape, which mates with a complimentary internal shape of the collar to prevent relative rotation of the collar on the rod while permitting the collar to slide axially along the rod. The resilient clamp includes spring sections on each end, one of which grasps the collar somewhat tightly but which permits manual rotation on the collar and the other which attaches the visor extension to the sun visor.

An alternate embodiment includes a rod which is generally circular in cross section but which has longitudinal serrations on its surface. The resilient clamp is snapped directly over this serrated surface. The serrations permit the clamp to move axially on the rod with relative ease but introduce significant resistance to rotation of the clamp on the rod. Thus the visor extension panel will tend to retain against gravity whatever up or down position to which it is positioned by the driver but may be moved laterally relatively easily.

In another embodiment, the rod is attached to the panel at only one end which permits even greater lateral adjustment of the panel relative to the sun visor.

The rod may be a separate member attached to the panel or, preferably, is molded integrally with the panel. Where the visor extension is incorporated into the sun visor as original equipment for an automobile, for example, the rod may be formed as part of the sun visor with the panel member attached through either of the arrangements discussed above. The permanently installed visor will preferably include, as a part thereof, a loop or spring into which a collar or a rod having serrations or a similar irregular surface may be inserted.

Any of the above described embodiments may be used with either a left side or right side visor.

BRIEF DESCRIPTION OF THE DRAWING(S)

This invention may be more clearly understood with the following detailed description and by reference to the drawings in which.

DETAILED DESCRIPTION OF THE INVENTION

Figure 1:
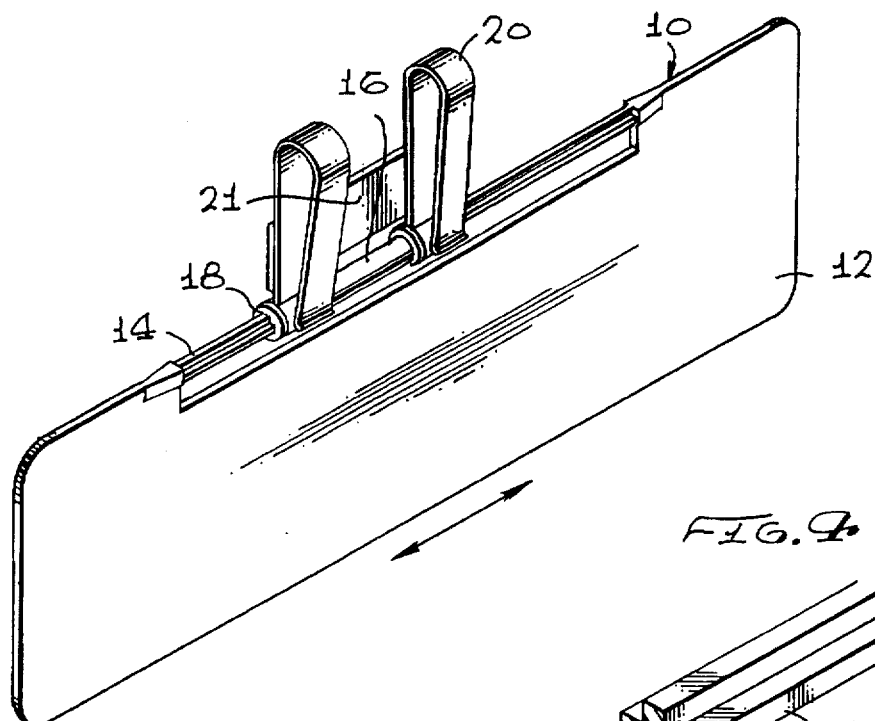
FIG. 1 is a perspective view of a visor extender according to the invention.

Referring now to FIG. 1, the visor extender 10 of the invention includes a flat rectangular panel 12, usually of plastic, having incorporated therein, as by molding, a rod 14 which has a non-circular cross-section. Fastened around the rod 14 is a collar 16 which has an inside contour mating with that of the exterior contour of rod 14 and an exterior contour which is generally cylindrical except for raised protrusions 18 at its ends. Snapped onto collar 16 is a resilient clamp 20 which has one or more cylindrical loops at one end to grasp collar 16 and one or more elongated loops at the opposite end for attaching to the vehicle sun visor. Clamp 20 may consist of two strips of spring steel secured in spaced relationship by means of a tie bar 21.

Figure 2C:
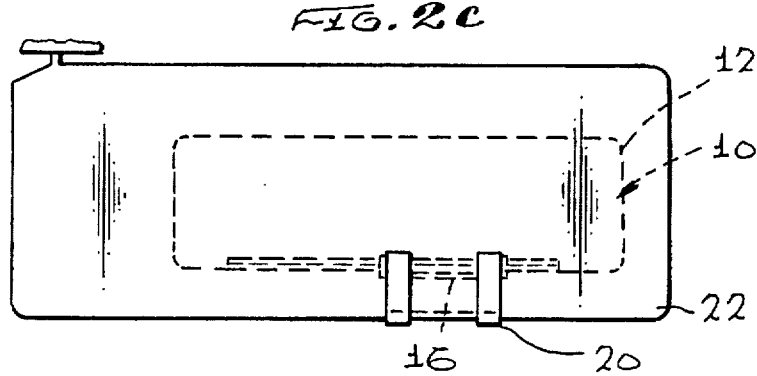
FIG. 2C shows the visor extender and sun visor of FIG. 2A with the visor extender hinged upwardly and not in use.
Figure 2D:
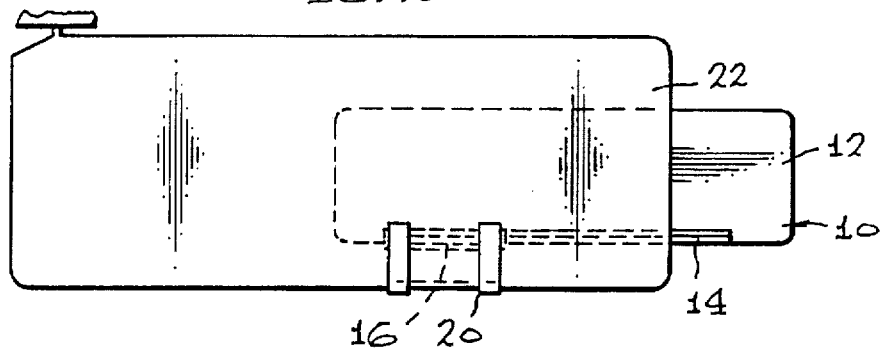
FIG. 2D shows the visor extender and sun visor of FIG. 2A with the visor extender hinged upwardly and moved to the right.
Figure 2B:
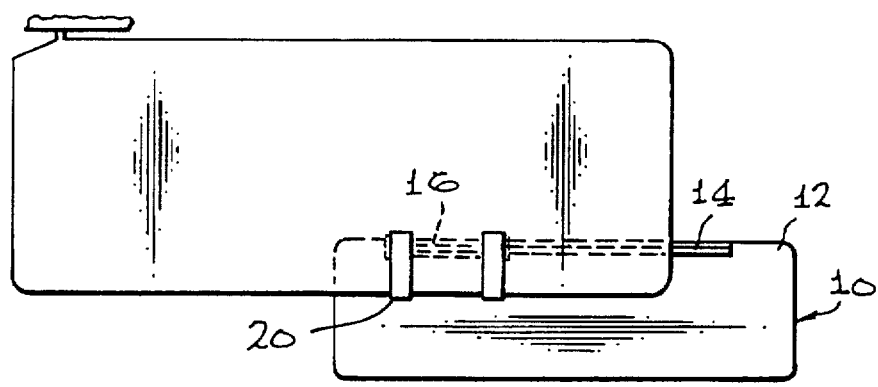
FIG. 2B shows the visor extender and sun visor of FIG. 2A with the visor extender hinged downwardly and moved to the right.
Figure 2A:
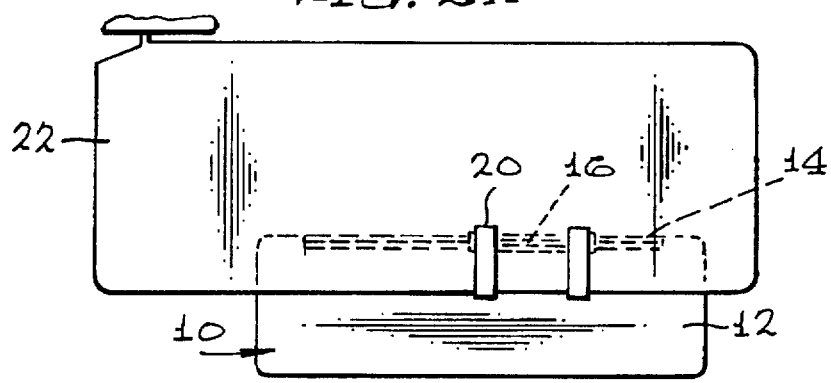
FIG. 2A is a view of a visor extender of FIG. 1 as attached to an automobile sun visor with the visor extender hinged downwardly.

FIG. 2A is a view of the visor extender 10 attached to a sun visor 22 and hinged downwardly extending below the sun visor 22. Parts of panel 12 and clamp 20 are visible. The upper part of panel 12 is shown in dotted outline as are rod 14, collar 16, and the rear part of clamp 20. Although panel 12 is usually opaque, it may also be of a dark, somewhat transparent plastic such as a dark green or grey which will substantially block the rays of the sun.

FIG. 2B shows the panel 12 hinged downwardly and also moved to the right. This position might be used to block the sun when it is low in the sky and to the right of the position where one would position panel 12 as in FIG. 2A.

FIG. 2C is a view of the visor extender 10 with panel 12 hinged upwardly behind visor 22 and not in use. In such case only part of the resilient clamp 20 is visible to the vehicle driver.

FIG. 2D shows the visor extender 10 with panel 12 hinged upwardly behind visor 22 and moved to the right so that panel 12 is in a position to block the driver's view of the sun between the visor 22 and a rear view mirror, for example. Should visor 22 be mounted on the right, the panel 12 may be positioned between the visor and a windshield post. Panel 12 also may be moved to the left of visor 22.

Figure 4:
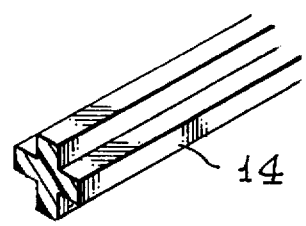
FIG. 4 is a perspective view, on an enlarged scale, of a circled portion 4—4 of FIG. 3.
Figure 3:
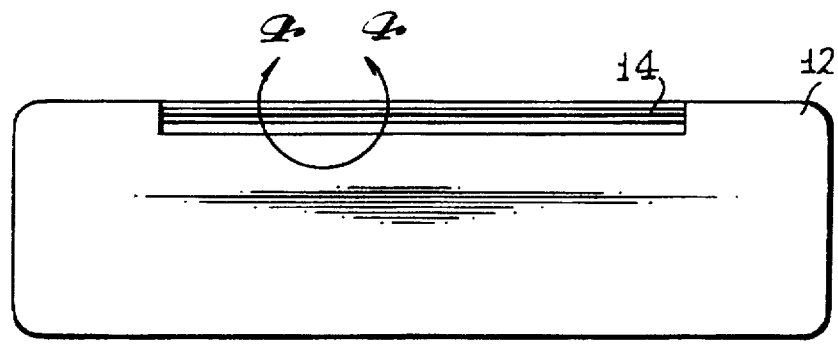
FIG. 3 is a plan view of the visor panel with a support rod integral with the panel.

FIG. 3 is a plan view of visor panel 12 with the rod 14 formed integrally therewith and FIG. 4 is an enlarged perspective view of an encircled portion of FIG. 3 marked 4—4. FIG. 4 shows that rod 14 has a cruciform cross section. Other non-circular cross section patterns may be used, it only being important that the cross-section of rod 14 and the mating internal passageway through the axis of collar 16 be non-circular.

Figure 5:
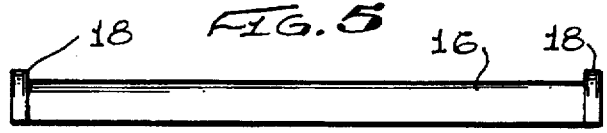
FIG. 5 is a side elevational view on an enlarged scale, of one half of a collar used with the rod of FIG. 4.

FIG. 5 is a side elevational view, on an enlarged scale, of an upper one-half of collar 16. The lower half is identical, the two collar halves being assembled around rod 14 and held together by clamp 20. They could also be cemented together around rod 14. The larger diameter protrusions 18 on the ends of collar 16 prevent clamp 20 from sliding off the ends of collar 16.

Figure 6:
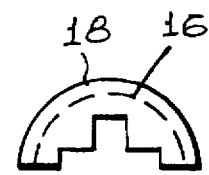
FIG. 6 is an end view of one of the two halves of the collar of FIG. 5.

FIG. 6 is an end view of the half collar shown in FIG. 5.

Figure 7:
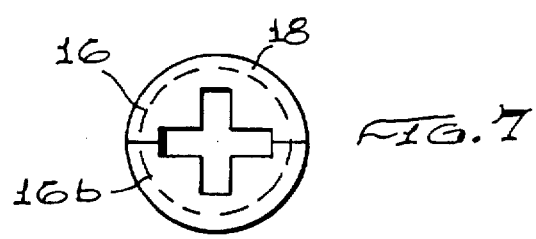
FIG. 7 is an end view of the collar of FIG. 5.

FIG. 7 is an enlarged end view of the assembled collar 16 showing the cruciform internal passage which mates with the surface of rod 14.

Figure 8:
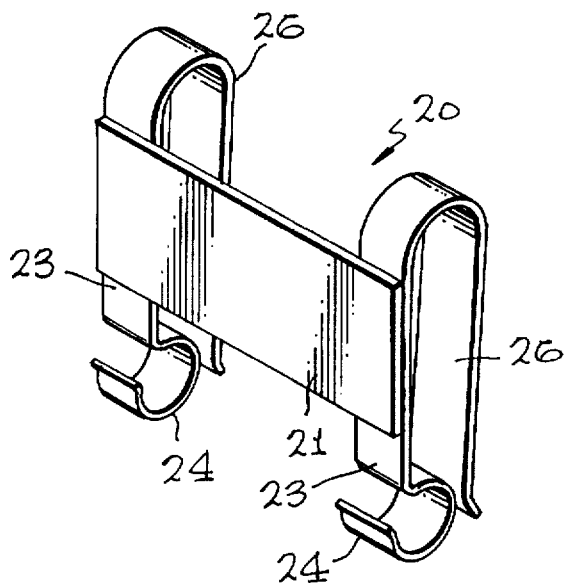
FIG. 8 is a perspective view of a resilient clamp for securing the visor extender to a sun visor.

FIG. 8 is a perspective view of the resilient clamp 20 which includes a pair of spring steel strips 23 bent to form smaller diameter partially cylindrical loops 24 which attach to collar 16 and larger elongated generally U-shaped loops 26 which attach to the lower edge of sun visor 22. The formed steel strips 23 are fastened together by means of a tie bar 21.

Figure 8A:
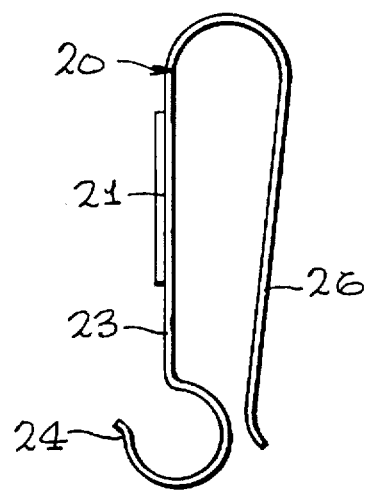
FIG. 8A is an end view of the resilient clamp member of FIG. 8.

FIG. 8A is an end view of a steel strip 23 showing loops 24 and 26.

Figure 8B:
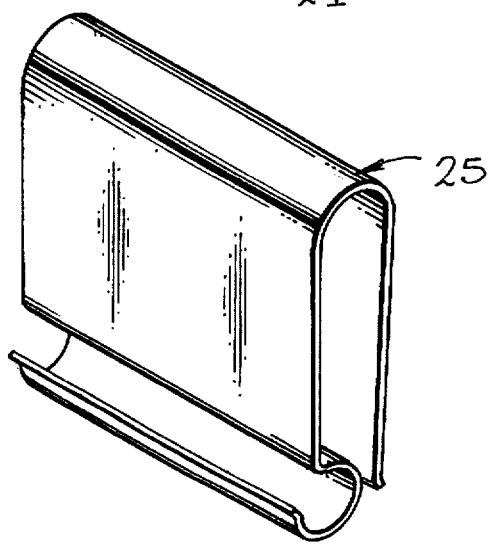
FIG. 8B is a perspective view of an alternate form of clamp for securing the visor extender to the sun visor.

A clamp similar to clamp 20 may also be formed of a single piece of resilient plastic such as nylon. Such a resilient clamp 25 is shown in FIG. 8B. The end view of resilient clamp 25 is essentially identical to FIG. 8A except for having no tie bar 21.

Figure 9:
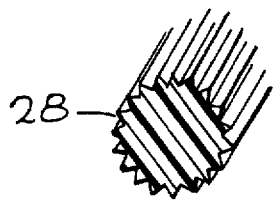
FIG. 9 is a perspective view similar to FIG. 4 of a portion of a rod having multiple serrations rather than being of cruciform cross section.

FIG. 9 is a view similar to FIG. 4 showing a portion of an alternative to the configuration of rod 14. This rod 28 is generally circular in cross section but includes a plurality of longitudinal serrations. With rod 28, no collar 16 is required and loop 24 of resilient clamp 20 simply clamps over the rod. The serrations on the rod 28 impose substantial resistance to rotation (as by vibration and gravity) of the loop 24 relative to the rod so that the panel 12 will remain in whatever position it was last given by the driver. The serrations impose less resistance to movement of the panel 12 longitudinally on the rod so that the panel may be easily moved laterally although there is sufficient resistance that the rod 28 will not move relative to resilient clamp 20 from vibration forces or forces from other normal driving activities.

Figure 10:
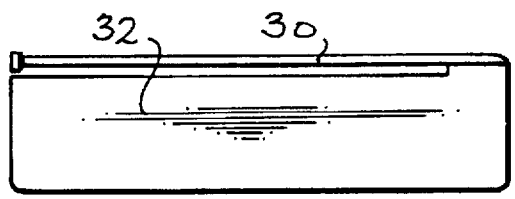
FIG. 10 is a plan view of a visor extender similar to FIG. 1 but with the visor extension supported at one end only.

FIG. 10 is a plan view of a modified visor extender which is supported at one end only. The rod 30 may be molded integrally with the panel 30 or be formed as a separate member and attached by any convenient means. It will be recognized that this arrangement permits somewhat greater travel of the panel 32 relative to the visor.

Figure 11:
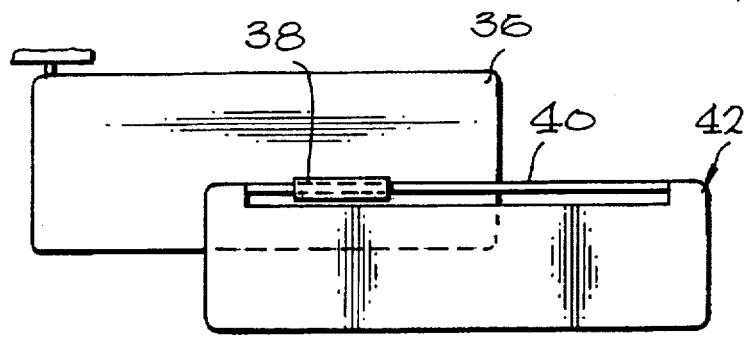
FIG. 11 is a plan view of the rear side of a sun visor with an integral clamp.

FIG. 11 is a plan view of the rear side of a sun visor 36 having an integral clamp 38 for securing a rod 40 forming part of a visor extender panel 42. With this arrangement, it is friction between the rod 40 and clamp 38 which is relied upon to hold panel 42 in the desired position and the surface of rod 38 would preferably be serrated like that of rod 28. Alternatively, rod 40 may be cruciform in cross section as described above and used with a collar 16.

The visor extender described herein may obviously be moved to any position such as against a door window, to which the associated visor is moved.

The above described embodiments of the present invention are merely descriptive of its principles and are not to be considered limiting. The scope of the present invention instead shall be determined from the scope of the following claims including their equivalents.

I claim:

1. A visor extender for use in a vehicle having a sun visor, said visor extender comprising a lightweight panel member;

a rod secured to said panel member, said rod having a non-circular cross section; and means surrounding part of the length of said rod for attaching said rod to said sun visor, wherein said attaching means including a collar member having an internal passageway in mating engagement with the surface of said rod, a generally cylindrical external surface, and a resilient clamp having a loop at one end engaging said generally cylindrical external surface said means and said rod cooperating to provide high resistance to rotating said attaching means relative to said rod.

2. A visor extender as claimed in claim 1 wherein said rod has a plurality of longitudinal serrations over its length.

3. A visor extender as claimed in claim 1 wherein said rod has a generally cruciform cross section.

4. A visor extender as claimed in claim 1 wherein the external surface of said collar includes integral larger diameter rings to capture said resilient clamp.

5. A visor extender as claimed in claim 1 wherein said collar member is comprised of two longitudinally split halves.

6. A visor extender as claimed in claim 1 wherein said attaching means includes a resilient clamp member secured to said sun visor and said rod is captured in said resilient clamp member.

7. A visor extender as claimed in claim 6 wherein said rod has a generally cruciform cross section.

8. A visor extender as claimed in claim 6 wherein the external surface of said collar includes integral larger diameter rings to capture said resilient clamp.

9. A visor extender as claimed in claim 6 wherein said panel member is formed of dark transparent material.

10. A visor extender for use in a vehicle having a sun visor, said visor extender comprising a lightweight panel member;

a rod secured to said panel member, said rod having a non-circular cross section; and means surrounding part of the length of said rod for attaching said rod to said sun visor, said attaching means including a resilient clamp member secured to said sun visor and a generally cylindrical collar secured in said resilient clamp member having an internal passageway mating with and surrounding a part of the non-circular cross section of said rod, said means and said rod cooperating to provide high resistance to rotating said cylindrical collar relative to said rod.

11. A visor extender as claimed in claim 10 wherein said rod has a generally cruciform cross section.

12. A visor extender as claimed in claim 10 wherein the external surface of said collar includes integral larger diameter rings to capture said resilient clamp.

13. A visor extender for use in a vehicle having a windshield and a sun visor, said visor extender comprising a lightweight generally rectangular panel member;

a rod secured to said panel member and spaced therefrom over a portion of its length, said rod having a non-circular cross-section;

a generally cylindrical collar surrounding a portion of the length of said rod, said collar including an internal passageway in mating engagement with the surface of said rod and a generally cylindrical external surface; and a resilient clamp for attachment to said sun visor including a first loop of generally U-shaped configuration configured to clamp on said sun visor and a second loop having a generally cylindrical configuration in snug snap fit relationship with the external surface of said collar.

* * * * *